United States Patent [19]

O'Hare

[11] Patent Number: 4,759,187

[45] Date of Patent: Jul. 26, 1988

[54] WIRE ENGINE

[76] Inventor: Louis R. O'Hare, 1066 A County Rd. 335, Pagosa Springs, Colo. 81147

[21] Appl. No.: 52,264

[22] Filed: May 21, 1987

[51] Int. Cl.$^4$ ............................................. F03G 7/06
[52] U.S. Cl. ..................................................... 60/527
[58] Field of Search ........................... 60/527, 528, 529

[56] References Cited

U.S. PATENT DOCUMENTS 4,041,706  8/1977  White ................................. 60/527
4,086,769  5/1978  Smith ................................. 60/527

Primary Examiner—Allen M. Ostrager

[57] ABSTRACT

The reciprocating motion that is provided when long arrays of wires of shape memory metal alloys are made to repeatedly change in length by means of repeated temperature alternations is made to occur more efficiently and more rapidly by means of a system that contacts first heated then cooled liquid in repeated alternations to the wire array by means of a unique liquid flow pattern in which the contacting of the liquid to the wires is made to occur virtually simultaneously to all increments of the length of each wire with the flow pattern being provided by an alternating displacement from one then the other of two horizontal cylinders parallel to a cylinder containing the wire array with the displacement of the liquid from the cylinders taking place by means of air pressure over the liquid in such a manner that first hot liquid from one cylinder and then cooled liquid from another cylinder is displaced into the cylinder containing the wire array by means of multiple ducts along the lengths of the cylinders which ducts connect the cylinder of hot liquid and the cylinder of cooled liquid to the cylinder with the wire array. In different embodiments different timing means are used to provide for the displacement of the liquid onto the wires and then for a period of removal of liquid from the wires and then for contacting the wires with the other liquid of alternate temperature and then its removal and so on.

9 Claims, 5 Drawing Sheets

WIRE ENGINE

This invention is related to my invention called, "Wire Engine for Water Pumps" which is U.S. Pat. No. 4,646,523. In this present invention as well as in my invention called, "Bimetallic Solar Engine", U.S. Pat. No. 4,551,978 metals change shape to produce a movement as they are in the process of changing from one shape to another. The movement of the metal provides physical motion that may be used to effect work energy and according to a rapidly developing art a number of inventions now apply this energy in the form of practical engines. Ten engines of this type are cited in the references of my previous patents referred to above. It is clear from these references that each of the prior art inventions have distinct advantages of their own, but the object of this present invention is to provide a very simple reciprocating motion in which the motion that is produced by the transition from one shape to another shape in a shape memory metal alloy is able to take place very rapidly and efficiently. To achieve this object conditions for a maximum rate of heat transfer to shape change metal are employed. One of these conditions is already employed according to the practice of the former art, namely the employment of shape memory metal forms that have extremely large surface area. Thin wires have large surface area and are able to be heated and cooled very rapidly to effect very rapid shape changes when the wires are composed of alloys of shape memory metals. An invention by White U.S. Pat. No. 4,041,706 is of this type. Another condition to achieve the maximum rate of heat transfer is to employ a heat transfer medium that can rapidly transfer heat to the wires. In this respect engines using water have an advantage over engines using air to transfer heat to or from the wires because the surface to surface heat conduction is greater between metal and water than it is between metal and air. However, according to the present invention a special flow pattern is also employed to inhance heat transfer to and from the wires of memory metal. By means of this inventive concept wires of great length can be employed for the advantage of large displacements while at the same time the entire length of wire can be rapidly contacted with liquid heat-transfer fluid. All of this is to be done with a minimum of distance required for fluid movement by having the lengths of the wires parallel to and in very close proximity to surfaces of both the heated a and the cooled liquids. The liquid surfaces are initially immediately beneath the level of the lengths of wire. Each liquid surface is elevated a short distance to contact the lengths of wire, first the surface of the heated liquid then the surface of the cooled liquid in repeated alternations. Immediately after the contacting of the wires with the heated liquid, the heated liquid is removed from contact with the wires before the contact with the cooling liquid is made. After the contacting of the cooling fluid with the wires, the cooling fluid is removed from the wires before subsequent contact is made with heating fluid and so on. The heated liquid is contained in a long cylinder beneath and parallel to a long cylinder containing the lengths of the wire elements. Similarily, the cooled liquid is contained in a long cylinder beneath and parallel to the long cylinder that contains the lengths of memory metal wires. Both cylinders containing heat transfer fluid before the liquid contacts the wires have pressure integrity except for multiple ducts which extend through the upper surface of the cylinder and deep into the liquid with the cylinder. The ducts that extend through the upper surface of each liquid-bearing cylinder extend through the bottom surface of the cylinder containing the wires. The outer surfaces of the ducts are sealed to the walls of the cylinders through which they pass with the effect that air pressure placed on the liquid in either lower cylinder will cause the liquid in that cylinder to rise through the ducts into the cylinder with the wires. Alternate pulses of air then lift first the heated liquid from one cylinder then the cooled liquid from the other into the cylinder with the wires thereby contacting the wires alternately with heated then with cooled liquid. By this alternate heating and cooling of the wires, the wires are caused to shorten and then lengthen along the length of the upper cylinder in which they are located. The timing of the alternations is determined by the positions of a drive rod attached to the wires by means of a drum. Each event necessary for the sucessful completion of a full cycle alternation is initiated by the change in position of the drive rod as it is moved by elongations and contractions of the lengths of temperature sensitive memory metal wires. When the drive rod is in the position at which its travel is being initiated in one first direction, air pressure is applied to the cylinder of heated water to lift the heated water from its cylinder into contact with the wires in the upper cylinder. At approximately the position of maximum travel in this first direction two events are caused to occur in sequence. First, air pressure applied at the beginning of travel in this first direction is removed in order to remove the heated liquid from contact with the wires. Then air pressure is applied to the cylinder containing the cooled liquid to lift the cooled water from its cylinder into contact with the wires in the upper cylinder. The cooling provides an elongation of the wires and an extension of the drive rod in a direction opposite the first direction. Near the position of maximum travel in this second direction a second group of events is initiated by the position of the drive rod. First, air pressure applied at the beginning of travel in this second direction is removed in order to stop the contact of the cooled liquid with the wires and then air pressure must be applied to the cylinder containing the heated liquid in order to begin the whole cycle again.

In different embodiments different systems are used to sense the position of the drive rod and to initiate the events that depend on that position. In one embodiment a cog on the drive rod makes electric contact with a latching relay by means of contact points at the positions of maximum travel. The contact at the position of maximum travel in one direction latches the relay while the contact at the position of maximum travel in the opposite direction unlatches the relay. In the latched position electric current is made available to pressurize the cylinder with the cool liquid. However this current is delayed by a delay relay that provides an interval of time of no current flow. This is for draining of heated liquid from the wires back to the cylinder of heated liquid. After the delay the latched relay provides current to a small compressor which pressurizes the cooling cylinder and thereby cools the wires and moves the drive rod to its opposite position of maximum travel where the cog makes a contact that unlatches the relay and stops the current to the first compressor. The unlatched position of the latching relay also makes current available to the second air compressor via another delay relay. An interval of no current flow provides for a period without air pressure in which cooled fluid may drain from the wires back to the cylinder of cooled liquid. After the delay interval the small air compressor that pressurizes the cylinder of heated liquid is energized by the unlatched condition of the latching relay and heated liquid is lifted by the air pressure into contact with the wires causing the drive rod to move again in its first direction and toward the first electric contact point to again latch the latching relay and begin the cycle again.

In another embodiment a valve is positioned alternately by cogs at points near positions of maximum travel on the drive rod. The valve determines the air flow direction to one or the other of the heating cylinder or the cooling cylinder. Intermediate movement of the valve actuating shaft between its flow condition in one direction or the alternate condition is a condition in which no flow occurs. Movement of the drive rod and the valve actuating shaft through the valve's intermediate condition provides for an interval of drainage when either heated or cooled liquid drains from the wires.

In another embodiment a special switch is used to achieve that period of delay during which there is a removal of air pressure and in which heat transfer fluid drains back to the cylinders. The switch is a single pole double throw switch. In either direction after a cog first opens a contact the actuating arm of the switch must move through a significant distance before reaching its over-center position where it latches its alternate contact. Cogs on the drive rod contact the switch actuating arm near the positions of maximum travel in either direction thereby keeping an open electric circuit to the compressors and air pressure is removed during that period while the switch is being moved toward its latching position at one of its alternate poles.

These and other embodiments will be clarified by referring now to the drawings.

Figure 1:
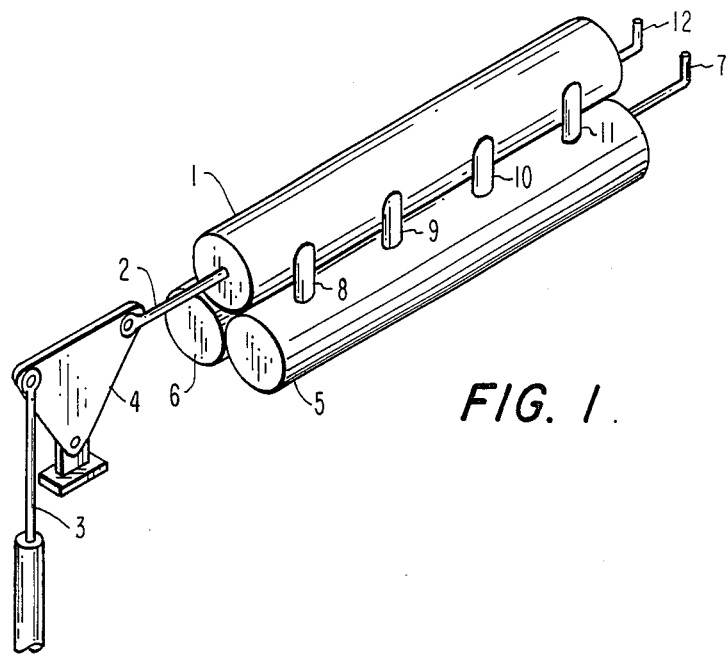
FIG. 1 shows 3 long cylinders with a drive rod extending from the top cylinder and a bell crank connected to the drive rod and to a pump shaft.

Referring to FIG. 1 the long cylinder 1 contains a thermal energy converter in the form of wires made from alloys of shape memory metals. Details of the converter are shown later in FIG. 2. The elongations and contractions along the lengths of thewires causes drive rod 2 to reciprocate. The reciprocations of 2 are transmitted to pump shaft 3 by bell crank 4. Cylinder 5 contains a cool liquid such as water which is periodically displaced into 1 by means of air pressure admitted to 5. The liquid and the wires are not shown in this FIG. 1. Cylinder 6 contains heated liquid such as water which is also displaced periodically into 1 in time periods alternate to those of displacement from 5. Alternate fluid flow communication by valving and ducting shown in subsequent drawings provides alternating pressurizations in 5 and then in 6 repeatedly heating and then cooling 1. Air connectors 7 and 12 admit air to 5 and 6 respectively. Liquid is displaced from 5 to 1 through displacement ducts 8,9,10 and 11.

Figure 2:
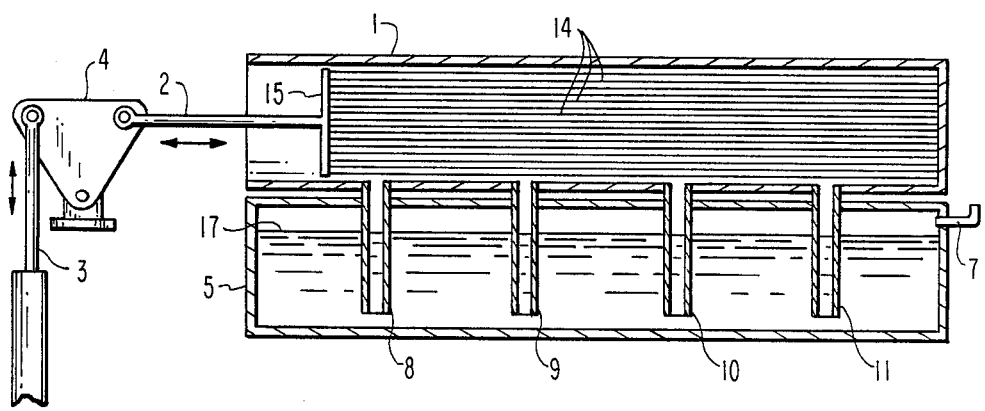
FIG. 2 shows a cross sectional view of two cylinders with liquid in the lower cylinder and a wire array with a drum and a drive rod in the upper cylinder, the drive rod being attached to a pump shaft by means of a bell crank.

In FIG. 2 the drive rod 2 is attached to lengths of shape memory metal wires 14 by means of moveable drum 15 on one end of the wires. On the other end of wire array 14 the wires are fixed in cylinder end plate 16. Contraction of 14 by heating moves 2 to the right. Elongation of 14 by cooling moves 2 to the left. Cooled liquid 17 and heated liquid, not shown now but later in FIG. 3 by 36, alternately cool and then heat 14. Cooled liquid 17 is displaced into 1 from displacement chamber 5 through ducts 8 and 11. The heated cylinder such as cylinder 6 in FIG. 3 functions as cylinder 5 but is not shown in the perspective of this FIG. 2. Air duct 7 admits pressurized air to 5.

Figure 3:
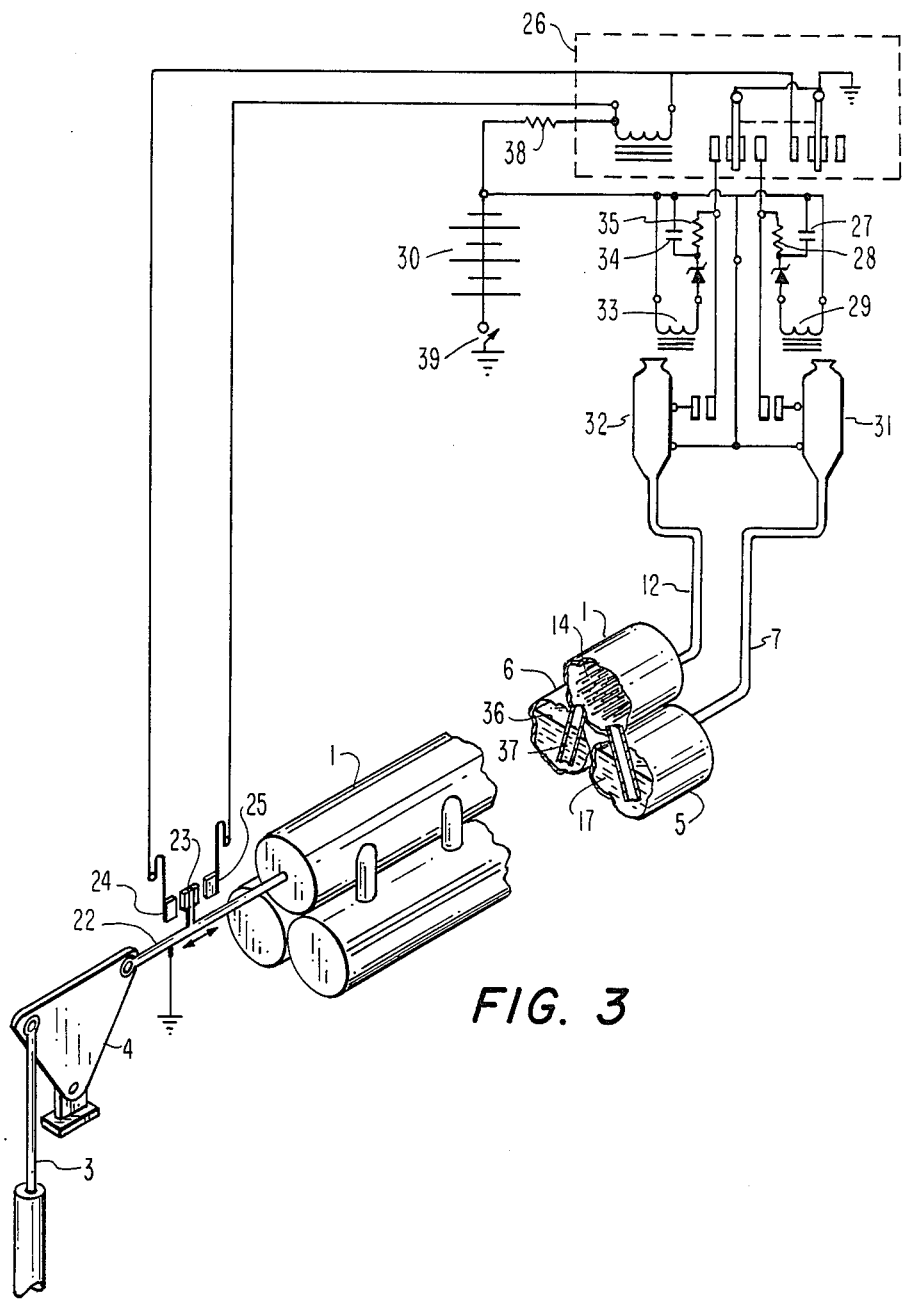
FIG. 3 shows a schematic diagram of a drive rod with a central cog and electric contacts for the cog near either end of the drive rod and an upper latching relay and two lower delay relays connected to two air blowers attached to two of three cylinders at the base.

Now in FIG. 3 a cross sectional view of cylinders 5 and 6 shows their location beneath cylinder 1 just as cylinder 5 is shown to be beneath 1 in FIG. 2 with a side view. In this FIG. 3 drive rod 22 corresponds to drive rod 2 of FIG. 1 but 22 is here shown with its cog 23 which moves back and forth between electric contact points 24 an and 25 and makes electric contact with these points near the position of maximum travel in either direction. When 23 contacts 25 relay 26 is latched by the movement to the left of the armature on the right side. When 23 contacts 24 latching relay 26 is unlatched by the temporary shunting of its coil. In the latched condition 26 begins to charge capacitor 27 through resistor 28 until sufficient voltage is aquired by 27 to energize time delay relay 29. When 29 is energized current source 30 delivers electric current through 26 and 29 to small air compressor 31 which then moves cooling liquid from cylinder 5 to wires 14 in cylinder 1 thereby elongating the array 14. This elongation allows the weight of pump shaft 3 to pivot bell crank 4 counter clockwise and move 22 to the left until cog 23 contacts 24 which unlatches 26 removing current from 31. Now there is a delay before 26 can deliver current to small air compressor 32. This delay is due to time delay relay 33. During the delay the cooling liquid in 1 flows back to 5. When capacitor 34 is charged through resistor 35 the voltage across 33 is sufficient to energize 33 and to cause it to complete the circuit from 30 through 26 to 32. When compressor 32 places air pressure on heated liquid 36 in cylinder 6 the heated liquid is displaced through displacement duct 37 to array 14 which then contracts, moving 23 toward 25. Contact of 23 and 25 again latches 26 removing current from 32 and draining heating liquid from 1 in the time delay before 29 is again energized to complete the current flow from 30 to 31 through 26. Resistor 38 limits current flow when relay coil 26 is shunted. Switch 39 closes the system circuit.

Figure 4:
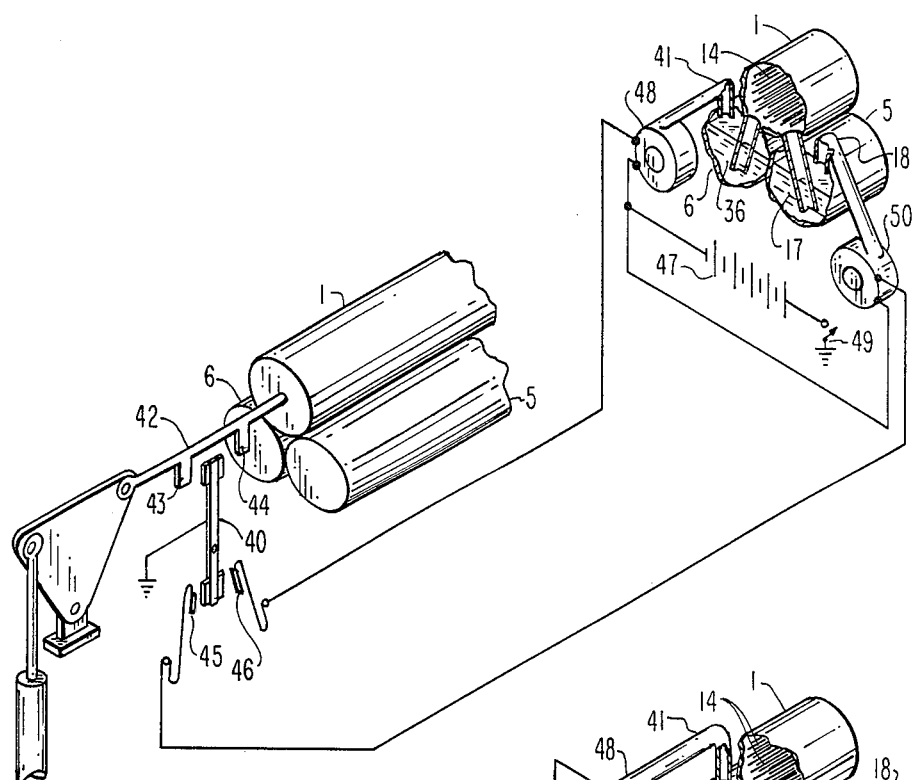
FIG. 4 shows a diagram of a drive rod with cogs at either end for contacting the pivot arm of a switch below the drive rod and two small air compressors on the sided of three cylinders.

In FIG. 4 the single pole, double throw switch 40 performs the functions of latching relay 26 and time delay relays 29 and 33 of FIG. 3. In this FIG. 4 drive rod 42 corresponds to drive rod 2 of FIG. 1 and FIG. 2 but 42 has cogs 43 and 44 in this embodiment of the basic inventive concept. Switch arm 40 is contacted by 43 and 44 near the limits of travel of 42 in either direction as 42 reciprocates back and forth. When 43 engages 40 the contact points 40 and 46 are opened and current flow to centrifugal compressor 48 is removed. When system switch 49 is closed during operation current flow is given three alternatives. It can flow from 40 through 46 to 48, or it can flow from 40 through contact 45 to centrifugal air compressor 50 from current source 47, or the current can not flow at all during delay periods while 40 is in transition. The removal of current from 48 permits heated liquid 36 to drain from cylinder 1 to cylinder 6 during the transition period as 40 moves from 46 to 45 while neither 48 nor 50 are providing air pressure and air is able to flow back through the vanes of the centrifugal compressors. As wires 14 continue to contract under the influence of residual heat and 40 reaches its over-center position 40 rotates clockwise and engages contact 45 closing the circuit from 47 through 48 to 50. Compressor 50 then places air pressure on cooling liquid 17 in cylinder 5 displacing it into cylinder 1 thereby expanding 14 and moving 42 to the left until cog 44 engages 40 and opens the circuit to 50. The circuit will then remain open permitting drainage of cooling liquid from 1 back to 5 until 44 moves 40 back to its over-center position where 40 will again engage 46 to cause current to flow to 48 thereby again placing pressure over heated liquid 36 and displacing it into 1 to cause the contraction of 14. The movement of 42 to the right then causes 43 to engage 40 and to open 40 from 46 again and to repeat the cycle. Air ducts 18 and 41 admit air pressure to 5 ant 6 respectively.

Figure 5:
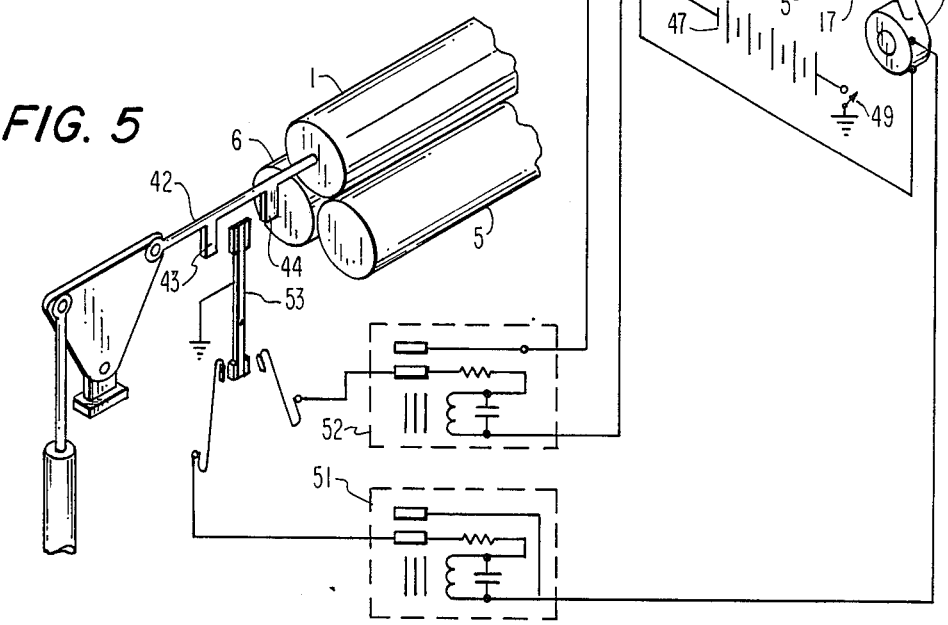
FIG. 5 shows a diagram of a drive rod with cogs and a switch connected to two time delay relays that are connected to two small air blowers with ducts to two cylinders that are beneath a third cylinder.

In FIG. 5 the time delay relays 51 and 52 provide additional control over periods of removing cooling and heating liquid from contact with the temperature sensitive wires 14. When drive rod 42 moves to the right, cog 43 engages switch 53 which closes a circuit from source 47 through switch 49 and time delay 51 to centrifugal air compressor 50. After the delay determined by 51 for draining cylinder 1, the compressor 50 forces air over cooling liquid 17 in cylinder 5 to move the liquid into contact with shape memory metal wires 14, which elongate when cooled, moving 14 to the left until cog 44 engages 53. Current then ceases flowing to 50 but now flows through time delay relay 52. After a time delay in which the cooled liquid in 1 flows bach to cylinder 5, air from copressor 48 moves heated liquid 36 into 1 and onto 14 thereby causing the contraction of 14 and moving 42 to the right until 43 again engages 53 switching off 48 and again sending current to 51 and 50. The delay that is caused when 43 initially engages 53 provides a period in which both 48 and 50 are without electric current and in which air pressure is removed from 6 thereby allowing the return of heated liquid from 1 back to 36 before cooling fluid again cools 14 to continue the cycle.

Figure 6:
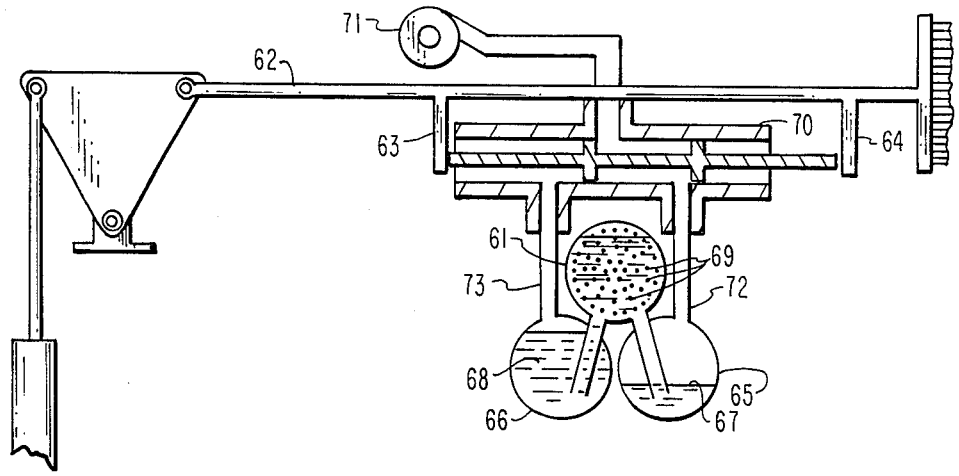
FIG. 6 shows a drive rod with cogs above an air valve in one condition and the valve is connected to two cylinders in an array of three cylinders.

In FIG. 6 the drive rod 62 corresponds to 42 of FIG. 4 and cogs 63 and 64 correspond to 43 and 44 of FIG. 4. The cylinders 61,65 and 66 of FIG. 6 correspond to 1,5 and 6 of FIG. 4. The thermal transfer liquids 67 and 68 correspond to 17 and 36 of FIG. 4 and the wire array 69 of FIG. 6 corresponds to 14 of FIG. 4. In FIG. 6 a spool valve 70 functions to place air pressure alternately on 67 and 68 as well as to remove pressure alternately from 67 and 68. Air pressure is admitted through valve 70 to cylinder 65 only near the point of maximum travel when 62 has moved all of the way to the right. Similarly, air pressure is admitted to 66 through 70 only near the position of maximum travel when 70 has moved all of the way to the left. However, in the transition distance before reaching the limits of travel in either direction valve 70 provides venting for both 65 and 66. For instance, while 62 is moving to the right, after 63 has engaged 70 and is in transition and in a position before 70 provides fluid flow communication between air compressor 71 and 65, the valve 70 opens a passage from 66 and from 65 to ambient air. This passage through 70 produces a pressure reduction over heating fluid 68 allowing heating fluid 68 to return to 66. When 70 moves through this same transition space in the opposite direction, the venting of air pressure from 65 allows cooling fluid to return from 61 to 65. When 63 is all of the way to the right the passage of 65 to ambient is closed and a passage from 65 to 71 is opened placing pressure on 67, displacing it into 61 thereby cooling wires 69 and elongating wires 69 and moving 64 to the left. As 70 reaches its full lefthand position it closes 66 to ambient air and provides fluid flow communication between 71 and 68 causing air pressure to move heated liquid 68 into contact with wire array 69 which then contracts, moving 62 to the right to begin the cycle over again.

Figure 7:
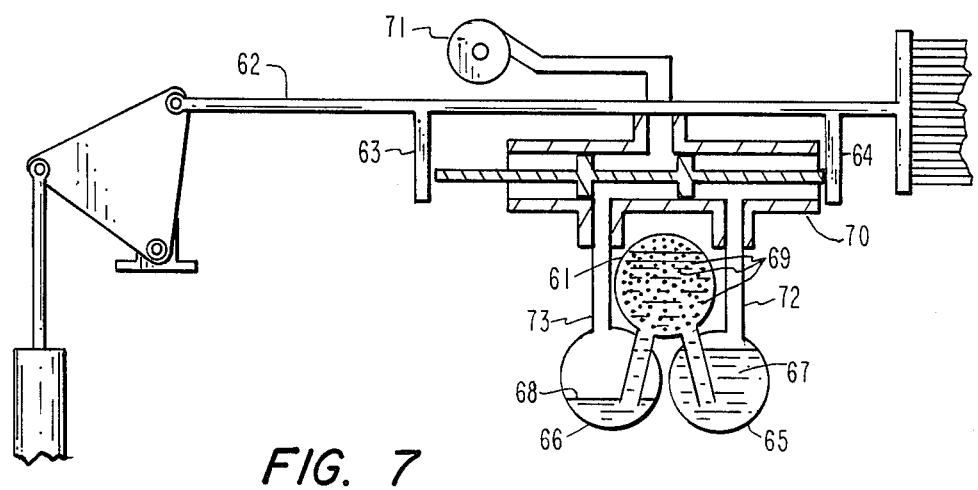
FIG. 7 shows a drive rod with cogs above a valve in an alternate condition.

In FIG. 7 all of the elements are the same as in FIG. 6 except that the system control valve 70 is shown in an alternate condition in which it now provides fluid flow communication between 71 and 66 rather than between 71 and 65 as it does in FIG. 6. It is to be understood that valve 70 has an intermediate condition in which both 65 and 66 are open to ambient air. In this intermediate condition compressor 71 is closed to both 65 and to 66. The intermediate condition is not shown in the drawings but it can be readily understood by projecting the movement of the valve to its midpoint position.

Figure 8:
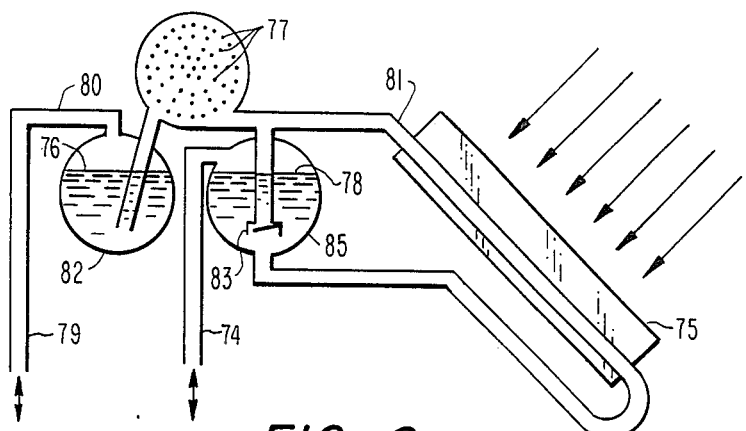
FIG. 8 shows a view of the three cylinders observed from the ends of the cylinders with a side view of a solar collector connected to the heated liquid cylinder.

In FIG. 8 alternate pressurization and depressurization of air admitted through air tube 74 first forces heating liquid 78 in cylinder 83 upward through hydronic solar collector 75 and through duct 81, contacting it into temperature sensitive wires 77 and then in a following period removes the heated liquid from 77. Then an alternate pressurization and depressurization through air duct 79 first forces cooling liquid 76 in cylinder 82 through duct 80 into contact with 77 and then removes it from 77 and so on in repeated cycles. Check valve 83 provides one way flow through collector 75.

Figure 9:
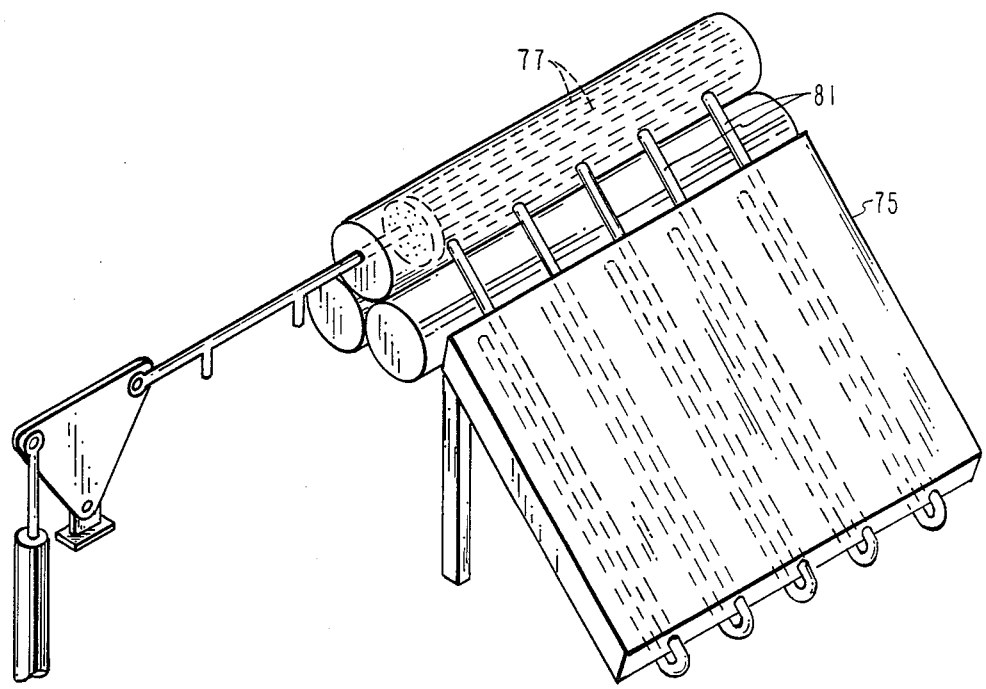
FIG. 9 shows the open face of a sloar collector with connections to the energy converter cylinder in which the temperature responsive wires are located.

In FIG. 9 the hydronic collector 75 of FIG. 8 is shown on a frontal view with multiple ducts 81 which correspond in function to duct 81 of FIG. 8 and transfer heated liquid from 75 onto wires 77.

In order that the essentials of the invention might be set forth with appropriate emphasis and clarity, details of ancillary mechanisms not absolutely necessary to essential function have been omitted or kept to a minimum in the drawings. For this reason the heated and cooled liquids 36 and 17 have been treated as entities isolated from their sources of heat and cooling. Onlyone heating means is shown in FIGS. 8 and 9. This treatment does not reduce the inventive concept to an inoperable condition because the engine will run for as long a period as 17 remains cool and as long as 36 remains heated, but it is not intended to limit the invention to such short terms of operation but rather herein to provide means of having the heated liquid continually heated and to have the cooled liquid continually cooled. This is accomplished by a variety of heat transfer mechanisms. In one embodiment cylinder 6 of FIGS. 2 through 5 is heated by being placed above a long horizontal solar collector of the hydronic type. Appropriate ducting connects the ends of the collector to the ends of cylinder 6 to thereby provide circular fluid flow communication through the collector and through the cylinder to transfer heat from the collector to the liquid in the cylinder. Convection currents may be assisted by a small circulating pump inserted in series between the collector and the cylinder.

In a similar embodiment seperate heat transfer tubes are inserted through the ends of cylinder 6 and sealed to it to prevent leakage from 6 at the ends. Other heat transfer tubes are inserted through the ends of cylinder 5 in the same way. Heated fluid flowing through the tubes in 6 then heats the liquid 36 in 6, and cool fluid flowing through the tubes in 5 cools liquid 17. This same system applies to the heating and cooling of liquids 68 and 67 respectively in FIGS. 6 and 7. This type of heat exchange involving the transfer of heat through the walls of heat exchange tubes inserted into the heating and cooling cylinders is employed in those embodiments which utilize low grade therm thermal energy available from a well or borehole that is being pumped by this wire engine. For example when hot oil is being pumped at an oil field by this present invention, the oil flow from the pump is directed by ducting to flow through heat transfer tubes inserted in 6. Correlatively, cool water from a water well being pumped by this engine is directed by ducting through heat exchange tubes in cylinder 5 to cool liquid 17. Liquids 67 and 68 in FIGS. 6 and 7 are heated and cooled in the same manner in that embodiment.

Another detail that has received only a minimum of description in the drawings in order to better emphasize the interrelationship of basic components concerns the type of air compressor to be used. For example in FIG. 3, the compressors 32 and 33 must be of the type that provides an air flow path through the compressor when the compressor is not operating because it is necessary to remove pressure from cylinders 5 and 6 before liquid can drain back into those cylinders. For example, the most convenient manner of releiving air pressure from the cooling liquid 17 in cylinder 5 of FIG. 3 is to employ a centrifugal compressor for compressor 31 because a centrifugal air blower has an air flow path back through the compressor when the compressor is not operating during the periods when 17 is draining bach into 5. The flow path for air to move from cylinder 5 is a path around the impeller blades of the centrifugal compressor. The same type of compressor is used for compressor 32 of that figure for the same reason. The type of air compressor that is used to fill a small air matress is ideal for this purpose as the volume of air is high and the compressor consumes just a few amperes at 12 volts. A small solar electric panel can power this type of compressor. If positive displacement pumps are used for air pressure then valves must be used to vent air from the cylinder during the periods when current is removed from the cylinder. An electric valve that is normally open may be placed in a parallel electric circuit with the current that drives the compressor so that the valve opens when the compressor is not receiving current. Such a valve would merely intersect the air inlet duct such as duct 7 in order to provide a flow path out of the duct to ambient air whenever current is not flowing into a compressor such as compressor 31. Other details also have been described with a minimum of diagram content in the drawings for the sake of conceptual clarity. These are details about the air inlet ducts 7 and 12 in FIGS. 1 and 3 and ducts 18 and 41 in FIGS. 4 and 5 and ducts 72 and 73 in FIGS. 6 and 7. In the drawings only one duct is shown to inlet air pressure to the cooling liquid and one duct is shown for inducting air pressure into the heating liquid cylinder, but it is not intended to limit the inventive concept to a single air duct for displacing cooling liquid nor to limit the invention to one duct for pressurizing the heating liquid cylinder, but rather multiple ducts along the length of each cylinder are connected in parallel to the air duct shown in the diagrams to be connected to each cylinder. This procedure facilitates a very rapid injection of air along the entire length of the cylinder.

I claim:

1. A heat engine comprising:
   a source of heated liquid, a source of cool liquid provided by a liquid duct located in a cool region,
   a thermal energy converter comprising a plurality of lengths of thermally responsive shape memory metal wires, each of said wires having one end attached to a drum which slides lengthwise in a cylinder and which is fixed to a moveable drive rod, said lengths of wire being mounted on said drum in a parallel manner in which each length has one end fixed to said drum and its opposite end fixed to a cylinder end plate such that heating and cooling the parallel arrayed, thermally responsive wires produces elongations and contractions of said wires and a reciprocable movement in said moveable drive rod attached to said drum so that said reciprocable movement may be communicated to an external load and
   means of supplying alternate immersions of liquid from said sources of heated and cool liquid into said thermal energy converter comprising an air compressor, air pressure switching and two displacement chambers in the form of long cylinders, one containing heated liquid the other containing cool liquid, both cylinders being located below said thermal energy converter, said air pressure switching repeatedly alternating pressurized air for displacement from said air compressor first to the cylinder of heated liquid then to the cylinder of cool liquid with periods of drainage between each pressurization, said pressure alternations being first to displace heated liquid from one cylinder into the energy converter and then to displace cool liquid into the converter from the other cylinder such that alternate immersions of heated and then cool liquid move into the cylinder of the thermal energy converter to first heat and then cool the heat sensitive wires in the cylinder producing a reciprocating movement in said drive rod.

2. A heat engine as in claim 1 in which the air pressure switching that supplies alternate heated and cool liquid immersions for the thermally responsive wires is an electric current switching system having electric contact points, a latching relay, two time delay relay circuits and two air blowers, said contact points being single pole double throw in which the central contact alternately engaging the other two is fixed to the drive rod, each of the other two being near a position of maximum travel of the central contact point on the drive rod in one of two directions of travel of the drive rod, said contacts being so connected to the latching relay that one engagement of the points latches and the other engagement unlatches it, in its latched condition energizing a time delay relay and then one air blower, in its unlatched condition alternately energizing the other time delay relay and then the other air blower, the one blower providing displacement pressure through ducting to said cool liquid cylinder the other blower providing displacement pressure through ducting to the heated liquid cylinder to alternately and repeatedly displace cool and then heated liquid into the energy converter cylinder, said time delay relays providing a period of time near the positions of maximum travel in either direction of the drive rod when neither blower is energized and fluid in said energy converter cylinder drains from it before being filled with fluid of a different temperature.

3. A heat engine is in claim 1 in which the air pressure switching that supplies alternate heated and cool liquid immersions for the thermally responsive wires is an electric current switching system having a pivoting electric switch, and two air blowers with ducting, said pivoting switch being single pole, double throw type in which the central switching contact engaging either one of the two other contacts is on a pivot arm which is contacted alternately by one then the other of two cogs on the drive rod, said contact being made near the positions of maximum travel in either direction and by contacting said pivot arm, said cogs acting first to open for a period a contact between said central pivoting contact and an alternate contact and then, after a period of pivot rotation, closing the opposite contact so that each cog is thereby providing a different path of current flow from the central contact, one path energizing a blower for air pressure to displace heated liquid from the heated liquid cylinder onto said energy converter, and the other path energizing the other blower for air pressure to displace cooled liquid onto said converter and so on in repeated cycles with each cycle having a period of no current flow during which neither blower is energized and draining of the energy converter takes place before it is again filled with a temperature alternating fluid.

4. A heat engine as in claim 1 in which the air pressure switching that supplies alternate heated and cool liquid immersions of the thermally responsive wires in the energy converter cylinder is an electric current switching system having a sinple pole double throw switch, two time delay relay circuits and two air blowers with ducting, said electric switch having its lever actuating arm positioned between two cogs fixed to the drive rod in such a way that each cog contacts the switch to change its condition near the point of maximum travel in one of the two directions of drive rod motion and said condition change in turn effecting a change in current path between the switch, one time delay circuit and one blower to another time delay relay circuit and another blower, said air blower in one path being energized to provide displacement air pressure through ducting to the cylinder of heated liquid after a period of time delay, said air blower in the other electric current path being energized alternately to provide displacement air pressure over the cool liquid through ducting to the cool liquid cylinder after a period of time delay, said time delay relay circuits providing periods between pressurizations in which pressure is removed and fluid drains from the energy converter cylinder.

5. A heat engine as in claim 1 in which the air pressure switching is in the form of air switching valving actuated by cogs on said drive rod alternating fluid flow communication in four part recurring cycles, each part of the four part cycle occurring at one time in each four part temporal sequence and not concomitantly with other parts of the cycle, providing firstly an air flow communication between said air compressor and the cylinder of cool liquid, secondly an air venting communication between said cylinder of cool liquid and ambient air, thirdly, an air flow communication between said air compressor and the displacement cylinder of heated liquid, and fourthly a venting air flow communication between said cylinder of heated liquid and ambient air, such that in each cycle the first flow of pressurized air displaces cool liquid from the cool liquid displacement cylinder into the energy converter cylinder, the second air flow vents air pressure from the cool liquid displacement cylinder into ambient allowing the energy converter to drain cool liquid back to the cool liquid cylinder, and then in a third time perion a third air flow displaces heated liquid from the heated liquid cylinder into the energy converter cylinder, the fourth flow vents pressure from the cool liquid displacement cylinder to drain the energy converter cylinder thereby cooling and heating said wires of said energy converter to complete one cycle of recurring cycles of reciprocation.

6. A heat engine as in claims 1 or 5 in which the air pressure switching is air flow switching valving comprising a spool valve with a valve actuating shaft for contacting cogs and two cogs fixed to the drive rod, said spool valve being fixed in position between the two cogs and being in the form of a cylinder with an air inlet port attached to said cylinder midway along the length of the cylinder, said cylinder having two exit ports attached radially, one port near each end of the cylinder, said spool valve having additionally two vent ports which are the open ends of the cylinder and a shaft which extends through the length of the cylinder and beyond the open ends to a distance on each side of the cylinder, said shaft being moveable within said cylinder along the length of the cylinder by means of two spools fixed to said shaft and capable ao sliding along the inner wall of the cylinder in the manner a piston sides in a cylinder maintaining an air tight seal between each spool and the cylinder wall, said spools being separated from one another along the length of the shaft as to form a cavity between them which is of sufficient length as to enclose said inlet port and one of said exit ports but not both exit ports thereby providing fluid flow communication exclusively between either exit port and the inlet port by means of the movement of the shaft to the extreme limits of its motion in either direction, said cavity having additionally an intermediate position in which neither exit port is within the encompassment of the cavity and both exit ports are open to the interior part of the cylinder not enclosed by the spools nor by the cavity between the spools, said intermediate position thereby providing fluid flow communication between the cool liquid displacement cylinder and ambient air through an exit port and through an open end of the valve cylinder, said intermediate valve condition also providing fluid flow communication between the heated liquid cylinder and ambient air for venting through the opposite exit port and the opposite open end of the valve cylinder, each of said two cogs being capable of contacting and moving said moveable valve shaft near the point of maximum travel in one direction of travel of the drive rod with said movement of said shaft altering the condition of the spool valve from a flow condition at an extreme limit of movement then to a flow condition at an intermediate position and finally to the other alternate condition at the opposite extreme limit of shaft movement such that each movement of the valve shaft in one direction and each contact of a cog to the valve shaft produces an alternation of air flow and air pressure from one of said displacement cylinders to the other and intermediate venting of both cylinders between said alternation and a complete reciprocation of the drive rod causes each cog alternately to contact said valve shaft moving it first to one then to the other of opposite extreme positions providing two alternations thereby displacing cool liquid into the energy converter at one extreme position of the valve and displacing heated liquid into the energy converter at the other limit with intermediate valve conditions between the extreme positions providing air pressure venting and energy converter draining.

7. A heat engine as in claim 1 in which the source of heated liquid is a solar collector of the type that heats a liquid, said collector being connected to said heated liquid cylinder by means of ducting providing circular fluid flow communication to said collector from said heated liquid cylinder then through said collector to said heated liquid cylinder.

8. A heat engine as in claim 1 in which the source of heated liquid is a solar collector of the type that heats a liquid, said collector being connected to said heated liquid cylinder by means of ducting connected to heat transfer tubing extending through said heated liquid cylinder, said heat exchange tubing being in thermal heat transfer communication with the heated liquid in the heated liquid cylinder and in circular fluid flow communication with said collector by said ducting extending from said tubing in said cylinder to said collector and then from said collector back to said tubing in said heated liquid cylinder.

9. A heat engine as in claim 1 in which the source of heated liquid is a solar collector of the type that heats a liquid, said collector being connected to said heated liquid cylinder by ducting and a check valve providing a one way circular fluid flow communication from the heated liquid cylinder through the collector and from the collector into the energy converted cylinder, and later in a draining period, continueing said flow through ducting from said energy converter cylinder to said heated liquid cylinder, said pressure alternations to displace heated liquid from the heated liquid cylinder to the energy converter cylinder thereby displacing heated liquid from said cylinder to the energy converter through said solar collector.

* * * * *